United States Patent [19]
Philipp et al.

[11] 3,712,081
[45] Jan. 23, 1973

[54] UNIVERSAL JOINT FOR COUPLING A PLURALITY OF SHAFTS

[76] Inventors: Gabriel Philipp, Ein Geddi St. 2/11, Holon; Stephan Braun, Hagalil St. 1/8, Carmiel, both of Israel

[22] Filed: Jan. 11, 1971

[21] Appl. No.: 105,219

[52] U.S. Cl. .................................64/17 R, 123/8.01
[51] Int. Cl. ...............................................F16d 3/16
[58] Field of Search..........64/12, 17 R, 18; 123/8.01; 418/33; 74/5; 308/2 A

[56] References Cited

UNITED STATES PATENTS

| | | | |
|---|---|---|---|
| 3,347,214 | 10/1967 | Plagmann | 418/35 |
| 3,481,158 | 12/1969 | Mayerjak | 64/12 |
| 3,264,880 | 8/1966 | Fischel | 74/5 |
| 3,294,071 | 12/1966 | Turco | 123/8.09 |
| 2,630,692 | 3/1953 | Naugler | 64/12 |
| 1,643,648 | 9/1927 | Tarbox | 64/18 |

*Primary Examiner*—Manuel A. Antonakas
*Attorney*—Benjamin J. Barish

[57] ABSTRACT

A universal joint for coupling a plurality of coaxial shafts to a common shaft; also an internal combustion engine of the rotary vane type including such universal joint in which the vanes are carried by the coaxial shafts. The universal joint comprises a fork fixed to each coaxial shaft, and a coupling member of substantially "Z" shape for each shaft. The two outer legs of the coupling member are pivotably mounted at the outer ends to the two arms of the respective fork, and the center leg of the coupling member is pivotable coupled to the common shaft and is fixed to the inner ends of the two outer legs.

3 Claims, 14 Drawing Figures

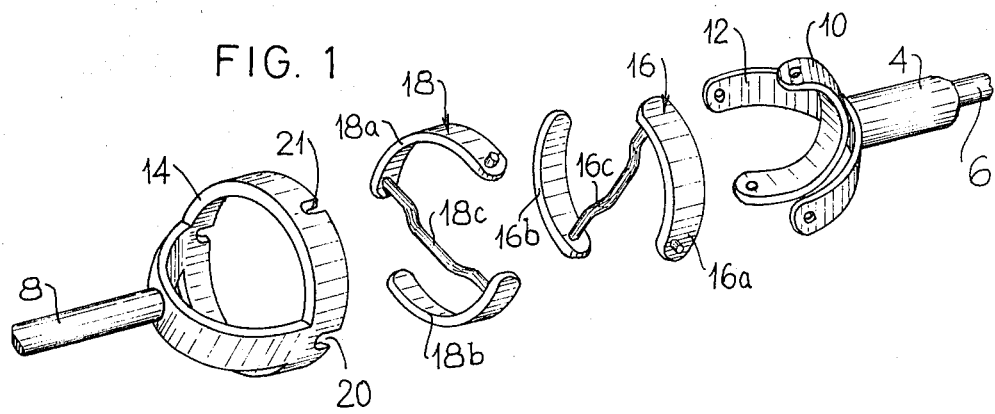
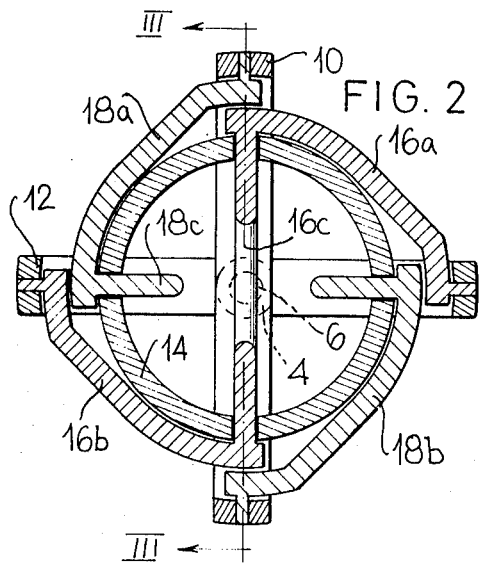
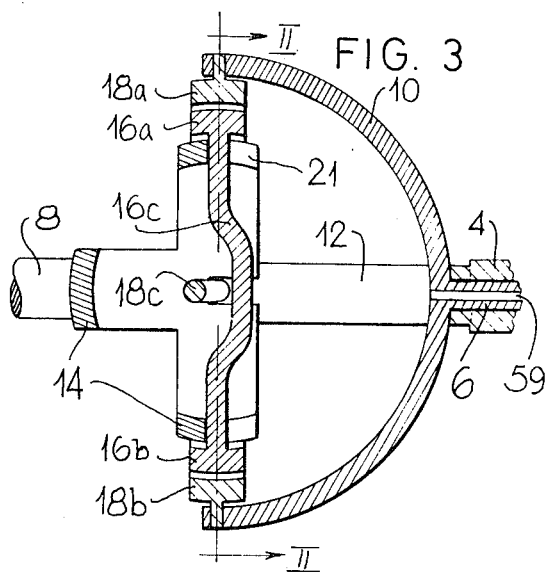
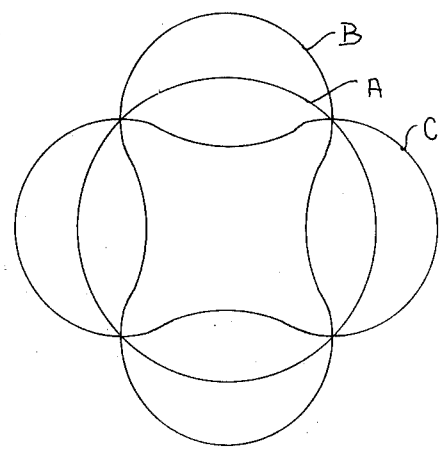
INVENTOR
GABRIEL PHILIPP
STEPHAN BRAUN
BY
ATTORNEY

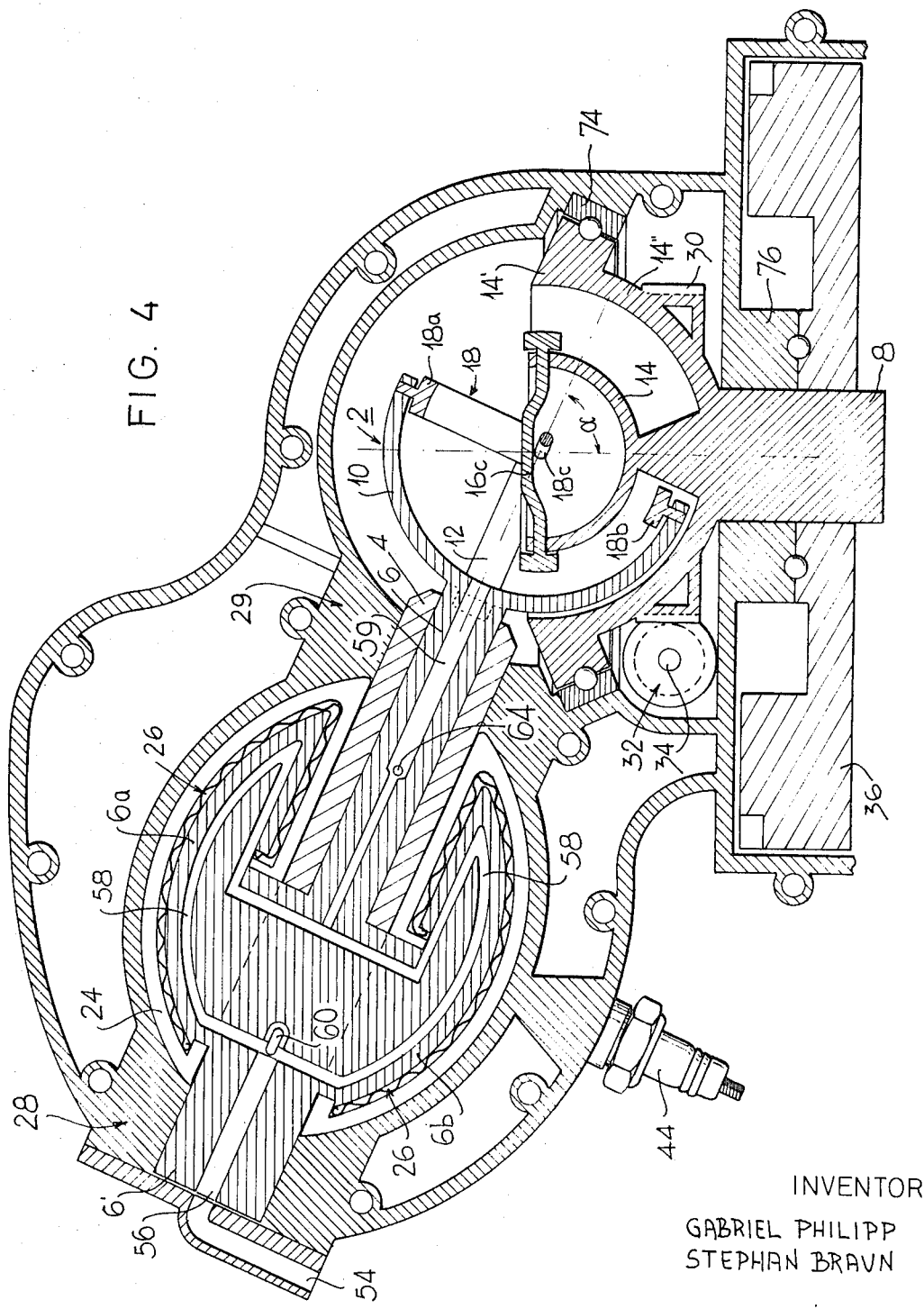

PATENTED JAN 23 1973 3,712,081

INVENTOR
GABRIEL PHILIPP
STEPHAN BRAUN

BY
ATTORNEY

UNIVERSAL JOINT FOR COUPLING A PLURALITY OF SHAFTS

BACKGROUND OF THE INVENTION

1. Field of the Invention

The present invention relates to universal joints for coupling a plurality of coaxial shafts to a common shaft disposed at an angle to the axis of the coaxial shafts. The invention also relates to such a universal joint included in an internal combustion engine of the rotary vane type, in which the vanes are carried by the coaxial shafts, e.g., as described in U.S. Pat. Nos. 3,294,071 and 3,347,214.

2. Description of the Prior Art

The known universal joints used in the above application generally suffer from one or more of the following disadvantages: In some universal joints, the acceleration forces are different for the inner and for the outer joint elements because of their different masses, and therefore counterbalancing weights have to be provided or an undue amount of vibration is produced. In other such universal joints having balanced masses, the joint includes a plurality of couplings each made up of several elements relatively movable with respect to each other in such manner as to subject them and their end bearings to rapid wear at the high rotary speeds involved. A further disadvantage of some joints is that they use parts expensive to manufacture and difficult to assemble. Further, many of the known universal joint constructions are incapable of use with more than two coaxial shafts.

SUMMARY OF THE PRESENT INVENTION

The present invention provides a novel universal joint having advantages in the above respects.

The invention also provides an internal combustion engine of the rotary vane type utilizing the novel universal joint.

According to the present invention, there is provided a universal joint for coupling a plurality of coaxial shafts to a common shaft disposed at an angle to the axis of the coaxial shafts, comprising a fork fixed to each of the coaxial shafts and a coupling member for each of the coaxial shafts. Each coupling member is of substantially "Z" shape, in which the two outer legs are pivotably mounted at their outer ends to the two arms of the respective fork. The center leg of the coupling member is pivotably coupled to the common shaft and is fixed to the inner ends of the two outer legs, maintaining them in fixed, substantially coplanar, parallel relationship during the rotation of all the shafts.

According to another feature, the coupled end of the common shaft terminates in a circular holder, the outer legs of the coupling members being curved to conform to the curvature of the holder, and the center legs of the coupling members extending diametrically across the holder.

In the described embodiment there are two coaxial shafts, two forks, and two coupling members, the center legs of the coupling members being at right angles to each other and pivotably mounted to the holder in the same plane thereof, the center portions of the coupling members being offset from their ends so as not to interfere with each other at their cross-over point.

According to a further feature of the present invention, there is provided the combination with the above novel universal joint, of an internal combustion engine of the rotary vane type in which the vanes are carried by the coaxial shafts.

Further features and advantages of the invention will be apparent from the description below.

BRIEF DESCRIPTION OF THE DRAWINGS

The invention is herein described, by way of example only, with reference to the accompanying drawings, wherein:

FIG. 1 is an exploded perspective view of a universal joint constructed in accordance with the invention;

FIGS. 2 and 3 are sectional views of the joint of FIG. 1, FIG. 2 being a section along line II—II of FIG. 3, and FIG. 3 being a section along lines III—III of FIG. 2;

FIG. 4 is a longitudinal sectional view through an internal combustion engine of the rotary vane type including the universal joint of FIGS. 1–3;

FIG. 6 is a polar diagram illustrating typical velocities of the shafts and the universal joint of FIGS. 1–3.

DESCRIPTION OF THE PREFERRED EMBODIMENT

Figure 5:
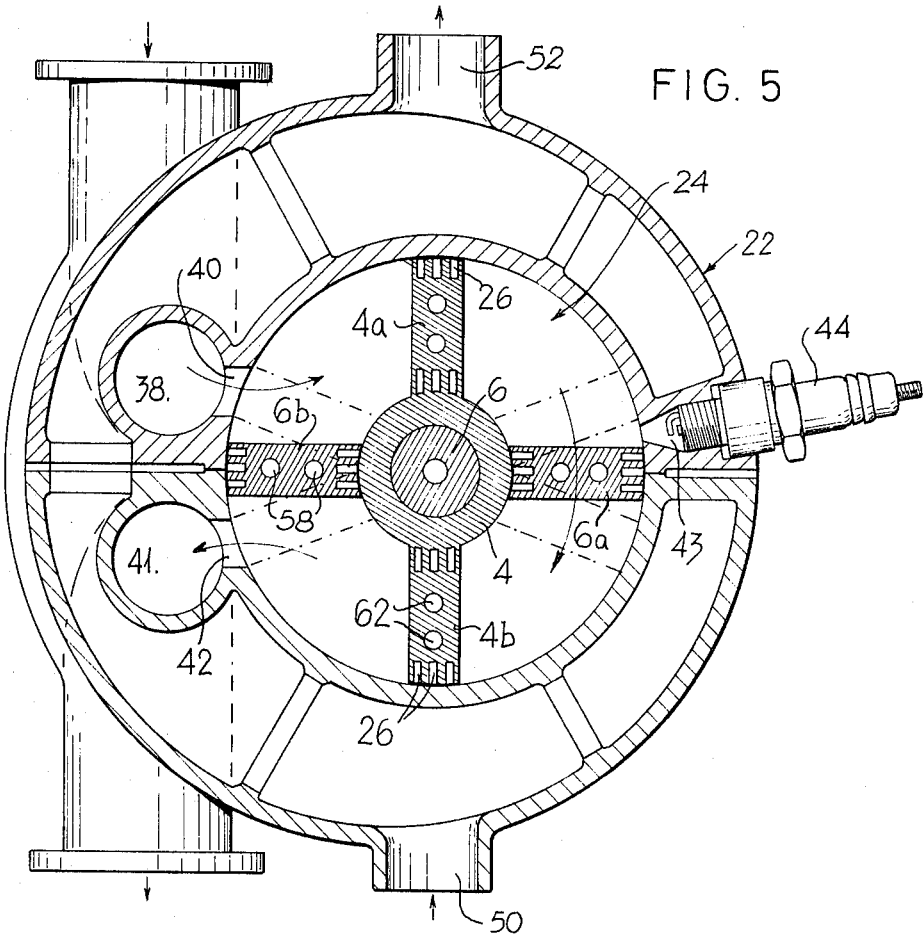
FIG. 5 is a transverse sectional view through the rotary internal combustion engine of FIG. 4.

With reference to FIGS. 1–3, there is shown a universal joint generally designated 2 for coupling a plurality of coaxial shafts 4 and 6 to a common shaft 8, the latter being disposed at an angle "$\alpha$" to the axis of the coaxial shafts. A fork 10 is fixed to inner shaft 6, and a second fork 12 is fixed to the outer shaft 4. The common shaft 8 has fixed thereto a circular holder 14.

The universal joint 2 includes two coupling members 16 and 18, the former coupling fork 12 to holder 14, and the latter coupling fork 10 to holder 14. Each of the coupling members is of substantially "Z" shape. Thus, coupling member 16 includes a pair of outer legs 16a, 16b and a center leg 16c fixed to the inner ends of the two outer legs; and coupling member 18, of the same structure, also includes two outer legs 18a, 18b, and a center leg 18c fixed to the inner ends of the two outer legs. In assembled relationship (see FIGS. 2 and 3), the outer ends of legs 16a and 16b are pivotably mounted to the ends of fork 12, as shown by broken lines in FIG. 1, and the outer ends of legs 18a and 18b are pivotably mounted to the outer ends of fork 10. The center legs 16c and 18c are both pivotably disposed in holder 14 at right angles to each other. For this purpose, holder 14 is formed with a pair of axial, oppositely disposed openings or slots 20 pivotably receiving the ends of center leg 18c, and a second pair of oppositely-disposed openings or slots 21 for pivotably receiving the ends of center leg 16c, leg 16c being disposed at right angles to leg 18c. The ends of both legs 16c and 18c are mounted in the same plane in holder 14, their center portions being offset from their ends so as not to interfere with each other at their cross-over point.

As is well known with respect to universal joints whose axes intersect, such as those described in the publication cited above and also described in the book "Mechanism and the Kinematica of Machines," by W. Steeds (Pages 270–275) London, 1949, rotation of one shaft of the universal joint at a constant angular velocity through one cycle of rotation (i.e., through 360°), causes the shaft of the other to rotate at an angular velocity which increases and decreases in successive 90° fractions of the cycle. The above-cited Steeds book (on Page 274) shows a polar diagram of depicting the velocity of one shaft with respect to that of another where the angle "$c$" between the longitudinal axes of the two shafts is 30°. The desired velocity polar diagram for any specific application can be designed by selecting the appropriate angle "$\alpha$" according to well known design principles for universal joints, as discussed in the Steeds book.

FIG. 6 of the drawings illustrates a polar diagram showing the relative velocity between the drive shaft 8 (curve A) rotating at a constant angular velocity, and the vane shafts 4 and 6 (curves B and C) both rotating at non-constant angular velocities. It will be seen that the two curves B and C are identical in respect to each other but are 90° out of phase. It will also be seen that as one shaft (e.g., shaft 4, curve B) accelerates, the other shaft decelerates an equal amount, and vice versa.

By way of example, the double universal joint used in the engine illustrated in FIGS. 4 and 5 may be designed so that the distance traversed by the vanes of the higher speed shaft during any 90° fraction is four times that traversed by the lower speed shaft during the same 90° fraction. For this purpose, angle "$\alpha$" between the axes of shafts 4 and 6 with respect to shaft 8 is computed to be about 64°. It will of course be appreciated that other relationships could be used by the appropriate selection of angle "$\alpha$."

However, the universal joint of FIGS. 1–3 of the present invention has a number of important advantages over the known universal joints such as those referred to above. Important features of the novel arrangement of FIGS. 1–3 reside from the facts that each of the center legs 16c and 18c is fixed to the outer legs of its respective coupling member (16a, 16b and 18a, 18b), forming a one-piece unit with them and maintaining them in substantially coplanar, parallel relationship during the rotation of the shafts; and that the two forks and their coupling members are identical, so that the masses will be the same. Thus, a very balanced arrangement is provided which is free of undue vibrations, which obviates the need of counter-balancing weights, and which substantially lessens the wear and tear previously experienced in the other types of universal joints discussed above. In addition, the parts are simple and inexpensive to manufacture and to assemble. Further, although only two coaxial shafts and two coupling members are illustrated, this arrangement enables the construction of universal joints having more than two coaxial shafts, in which case there would be one coupling member of the "Z" shape described for each of the coaxial shafts.

FIGS. 4 and 5 illustrate an internal combustion engine utilizing the universal joint of FIGS. 1–3. The engine illustrated comprises a housing or stator 22 formed with a cavity 24 having a substantially elliptical or circular transverse section. In this case the cavity 24 is of ellipsoidal shape, but could be of other shapes, such as spherical or cylindrical. Concentrically mounted within cavity 24 are the two coaxial shafts 4 and 6. Shaft 4 carries a pair of diametrically-opposed vanes 4a and 4b, and shaft 6 carries a similar pair of vanes 6a and 6b. The outer edges of all the vanes are of rounded configuration conforming to the inner surface of cavity 24. Spring-pressed rings 26 are secured to the outer faces, being disposed in grooves or troughs thereof, and are pressed into contact with the inner surface of the cavity for effecting a seal between the vanes and the cavity wall, and between the vanes and the shafts 4 and 6.

The diameter of inner shaft 6 is enlarged at its end 6', beginning at about the mid-point of the axial length of its vanes 6a and 6b. Enlarged end 6' extends past the vanes and is journalled in a bearing 28 carried by stator 22. The opposite end of inner shaft 6 fixedly carries fork 10, the arms of which are disposed in the same plane as vanes 6a and 6b. The outer shaft 4 is journalled in a bearing 29 also carried by the stator and terminates at the point where the inner shaft 6 is enlarged, so as to be substantially flush with enlarged end 6' of the inner shaft. The vanes 4a and 4b carried by the outer shaft are also disposed in the same plane at the arms of fork 12 fixedly carried at the opposite end of the outer shaft.

As described earlier, fork 10 of inner shaft 6 is coupled to common shaft 8 (the vehicle drive shaft) by means of coupling member 18, and fork 12 of outer shaft 4 is coupled to common shaft 3 by coupling member 16. Holder 14 of shaft 8 may be semi-spherical and carries another concentric semisphere 14' formed with a gear 30 which meshes with a second gear 32 for driving, by means of its shaft 34, the oil pump, distributor (both not shown), etc. of the engines. A fly wheel 36 is fixed to drive shaft 8.

The stator housing 22 is formed with an inlet duct 38, communicating with the carburator for supplying the fuel through an opening 40 into the cavity 24. The stator housing is also formed with an outlet duct 41 for exhausting the burnt gasses from the cavity through an opening 42. At the opposite side of the cavity, the housing 22 is formed with a bore 43 receiving the spark plug 44, the bore being tapered inwardly and being of small diameter at the end leading into the cavity 24.

The stator is cooled by a cooling liquid such as water (but could be air-cooled) introduced through inlet 50 and exiting through outlet 52. The rotor is cooled by oil introduced through inlet 54 (FIG. 4) communicating with a bore 56 extending axially through the enlarged end 6' of shaft 6. The oil is then conducted through passageways 58 extending through vanes 6a and 6b, and then through bore 59 of shaft 6 to the universal joint 2 where the oil reservoir is provided. Vanes 4a and 4b are cooled by oil flowing through a cross-bore 60 which conducts the oil from bore 56 to the passageways 62 of vanes 4a and 4b, the oil leaving the latter vanes through cross-bore 64 leading to bore 59 in inner shaft 6. The cooling oil also lubricates the bearings 28 and 29, the universal joint 2, bearing 74 supporting holder 14, and bearing 76 through which drive shaft 8 is journalled. The interior of the engine cavity and vanes are lubricated by oil added to the fuel.

The operation of the engine illustrated will be better understood by reference to FIG. 7 depicting the movements of the vanes during one complete cycle of rotation, i.e., 360°. The following description considers only the chamber C formed between the confronting faces of vanes 6a and 4a. This engine is a four-stroke engine having the well known four phases, namely, intake, compression, ignition and exhaust.

A. Intake.

Figure 7A:
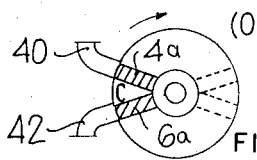
FIGS. 7a – 7h diagrammatically illustrate the movements of the rotary vanes during a cycle of operation.
Figure 7B:
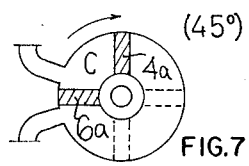

FIG. 7a illustrates in full lines the positions of the vanes at the beginning of the intake, and FIG. 7b illustrates their positions in the middle of the intake. During this phase, the speed of vane 6a decreases and that of vane 4a increases, and thereby the volume of the chamber increases to draw into the chamber the fuel mixture. The fuel is introduced through inlet 40 which at the beginning of the phase is closed by vane 4a, opens during the phase, and is closed again at the end of the phase by vane 6a. The positions of the vanes at the end of this portion of the cycle are shown in FIG. 7c.

B. Compression.

Figure 7C:
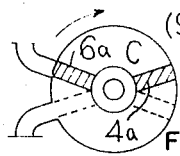
Figure 7D:
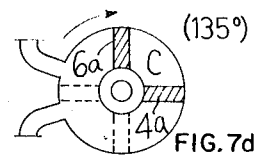

FIG. 7c illustrates in full lines the positions of the vanes at the beginning of the compression phase, and FIG. 7d their positions in the middle of this phase. During this phase, the velocity of vane 6a increases while that of vane 4a decreases, whereby the volume of the chamber is reduced. The positions of the vanes at the end of this phase are shown in FIG. 7e.

C. Ignition

Figure 7E:
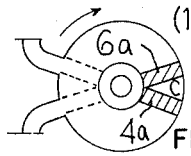
Figure 7F:
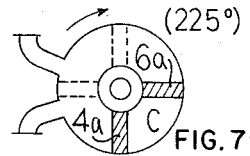

FIG. 7e also illustrates in full lines the positions of the vanes at the beginning of the ignition phase, and FIG. 7f their positions in the middle of this phase. When the volume of the chamber approaches its minimum, a spark is produced by spark plug 44 to ignite the fuel in the chamber. The explosive force is applied to both vanes 4a and 6a. However, at this portion of the cycle the velocity ratios resulting from the universal joint between the drive shaft 8 and the vane shafts 4 and 6, (the latter carrying vanes 4a and 6a, respectively) are such that vane 4a will accelerate to maximum velocity, while vane 6a will decelerate to minimum velocity. Thus, while the explosive force applied to vane 6a will tend to retard the movement of vane 4a, the retarding effect will be small as compared to the driving force on vane 4a as determined by the respective velocity ratio at this instant. The positions of the vanes at the end of the ignition portion of the cycle are illustrated in FIG. 7g.

D. Exhaust

Figure 7G:
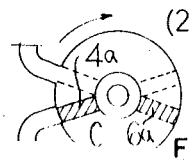
Figure 7H:
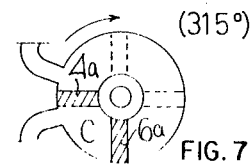

FIG. 7g also illustrates in full lines the positions of the vanes at the beginning of the exhaust phase. During this phase, vane 4a decreases its speed, whereas the speed of vane 6a increases. Thus the volume in the chamber will be reduced, expelling the combustion gases through outlet 42. The latter outlet is closed at the beginning of this phase by vane 4a, is later opened, and finally is closed again at the end of the phase by vane 6a. The positions of the vanes at the end of this portion of the cycle are illustrated in FIG. 7a.

It will be seen that the invention greatly simplifies the construction of the engine since it avoids the need for valves and requires only one spark plug. In addition, it enables the use of a simple dealing arrangement, e.g., conventional rings. Rotary engines can be constructed in accordance with the invention having a large power/weight ratio and operating at high rotating speeds. In addition, diesel type engines can be constructed in accordance with the present invention by replacing the spark plug with a fuel injector.

Further, the basic principles of the invention can also be used in vane-type rotary pumps, wherein the common shaft would be connected to a source of power such as an electric motor, and the fuel intake, ignition and exhaust systems would be replaced by a pair of fluid inlets, and a pair of fluid outlets, one of each pair being provided for one-half the cavity, as well known in vane type rotary pumps.

Many other changes, variations and applications of the illustrated embodiments of the invention will be apparent.

What is claimed is:

1. A universal joint for coupling a plurality of coaxial shafts to a common shaft, a plurality of coaxial shafts, a common shaft, said universal joint comprising, a fork fixed to each of said coaxial shafts, each fork having two arms, a coupling member for each of said coaxial shafts, each of said coupling members being of substantially "Z" shape and having two outer legs joined by a center leg, the two outer legs being pivotably mounted at their outer ends to the two arms of each respective fork, the center leg of each coupling member being pivotably coupled to said common shaft and being fixed to the inner ends of the two outer legs and maintaining them in fixed, substantially coplanar, parallel relationship during the rotation of all said shafts.

2. A universal joint according to claim 1, wherein the coupled ends of said common shaft terminate in a circular holder, the outer legs of the coupling members being curved to conform to the curvature of said holder, and said center legs of the coupling members extending diametrically across said holder.

3. A universal joint according to claim 1, wherein there are two coaxial shafts, two forks, and two coupling members, the center legs of the coupling members being at right angles to each other and pivotably mounted to the holder in the same plane thereof, the center portions of the coupling members being offset from their ends so as not to interfere with each other at their cross-over point.

* * * * *